United States Patent
Ante et al.

(10) Patent No.: US 7,911,201 B2
(45) Date of Patent: Mar. 22, 2011

(54) ACTIVE SENSOR ELEMENT AND METHOD OF DETERMINING THE TEMPERATURE OF AN ACTIVE SENSOR ELEMENT

(75) Inventors: Johannes Ante, Regensburg (DE); Markus Gilch, Mauern (DE); Stephan Heinrich, Pfeffenhausen (DE); Sergiu Muresan, Cluj-Napoca (RO)

(73) Assignee: Continental Automotive GmbH, Hannover (DE)

( * ) Notice: Subject to any disclaimer, the term of this patent is extended or adjusted under 35 U.S.C. 154(b) by 284 days.

(21) Appl. No.: 12/227,026

(22) PCT Filed: Mar. 16, 2007

(86) PCT No.: PCT/EP2007/052499
§ 371 (c)(1),
(2), (4) Date: Dec. 4, 2008

(87) PCT Pub. No.: WO2007/128610
PCT Pub. Date: Nov. 15, 2007

(65) Prior Publication Data
US 2009/0121706 A1    May 14, 2009

(30) Foreign Application Priority Data
May 5, 2006 (DE) .......................... 10 2006 021 430

(51) Int. Cl.
*G01P 3/46* (2006.01)
*G01P 3/48* (2006.01)

(52) U.S. Cl. .......................... 324/173; 324/160; 324/169
(58) Field of Classification Search .................. 324/160, 324/173, 179
See application file for complete search history.

(56) References Cited

U.S. PATENT DOCUMENTS

| 4,683,725 | A | * | 8/1987 | Sugiura ........................... 62/199 |
| 6,256,992 | B1 | | 7/2001 | Lewis et al. |
| 2005/0046463 | A1 | * | 3/2005 | Throngnumchai et al. ... 327/524 |
| 2006/0056486 | A1 | * | 3/2006 | Mikuni et al. ................ 374/178 |
| 2007/0186551 | A1 | | 8/2007 | Ante et al. |

FOREIGN PATENT DOCUMENTS

| DE | 19652046 | 6/1998 |
| DE | 10 2005 010 921 | 2/2006 |
| GB | 2 337 831 | 12/1999 |
| JP | 5322288 | 12/1993 |
| JP | 8288498 | 11/1996 |
| WO | WO 2006/005662 | 1/2006 |

* cited by examiner

*Primary Examiner* — Reena Aurora
(74) *Attorney, Agent, or Firm* — Cohen Pontani Lieberman & Pavane LLP

(57) ABSTRACT

The invention relates to an active sensor element for recording the speed of an exhaust gas turbocharger, comprising a suppressor circuit which has at least one diode. In order to specify a device for temperature measurement at the turbocharger and in particular at the turbocharger in the region of the active sensor, the current-voltage characteristics of the diode are evaluated for determining the temperature in the sensor element.

19 Claims, 4 Drawing Sheets

ACTIVE SENSOR ELEMENT AND METHOD OF DETERMINING THE TEMPERATURE OF AN ACTIVE SENSOR ELEMENT

CROSS REFERENCE TO RELATED APPLICATIONS

This is a U.S. national stage of application of PCT/EP2007/052499, filed on Mar. 16, 2007, which claims priority to German Application No.: 10 2006 021 430.7, filed May 5, 2006, the contents of both of which are incorporated herein by reference.

BACKGROUND OF THE INVENTION

Field of the Invention

The invention relates to an active sensor element and to a method of determining the temperature of an active sensor element.

The power generated by an internal combustion engine depends on the air mass and the corresponding quantity of fuel which can be provided to the engine for combustion purposes. In order to increase the power of the internal combustion engine, it is necessary to supply a greater quantity of combustion air and fuel to the internal combustion engine. In the case of a naturally aspirated engine, this increase in power is achieved by increasing the cubic capacity or by increasing the rotation speed. However, increasing the cubic capacity leads, in principle, to heavier, larger and therefore more expensive internal combustion engines.

One commonly used technical solution to increasing the power of an internal combustion engine is supercharging. This term describes the precompression of the combustion air by an exhaust gas turbocharger or else by a compressor which is mechanically driven by the engine. An exhaust gas turbocharger essentially comprises a compressor and a turbine which are connected to a common shaft and rotate at the same rotation speed. The turbine converts the otherwise uselessly stored energy of the exhaust gas into rotation energy and drives the compressor. The compressor draws in fresh air, compresses it, and delivers the compressed air to the individual cylinders of the engine. An increased quantity of fuel can be supplied to the greater quantity of air in the cylinders, as a result of which the internal combustion engine experiences a considerable increase in power.

The combustion process is also influenced in a favorable manner, and so the internal combustion engine achieves a better overall degree of efficiency. Furthermore, the torque profile of an internal combustion engine which is supercharged using a turbocharger can be configured extremely favorably. The existing naturally aspirated engines in series production by vehicle manufacturers can be substantially optimized by using an exhaust gas turbocharger without great intervention in the design of the internal combustion engine. Supercharged internal combustion engines generally have a lower specific fuel consumption and emit fewer pollutants. Furthermore, turbocharged engines are quieter than naturally aspirated engines of the same power since the exhaust gas turbocharger itself acts as an additional silencer.

In internal combustion engines with a large operating rotation speed range, for example in internal combustion engines for passenger cars, a high charge pressure is required even at low engine speeds. For this reason a charge pressure control valve, what is known as a waste-gate valve, is employed in these turbochargers (the terms turbocharger and exhaust gas turbocharger are used synonymously here). The selection of a corresponding turbine casing means a high charge pressure is quickly built up even at low engine speeds. The charge pressure control valve (waste-gate valve) then limits the charge pressure to a constant value as the engine speed increases. Turbochargers with variable turbine geometry (VTG) are used as an alternative to this. In these turbochargers, the charge pressure is regulated by means of the variation in the turbine geometry.

As the quantity of exhaust gas increases, the maximum permissible rotation speed of the combination comprising the turbine wheel, the compressor wheel and the turboshaft, which combination is also called the running gear of the turbocharger, can be exceeded. In the event of the rotation speed of the running gear being exceeded to an impermissible extent, said running gear would be destroyed, which is the same as total destruction of the turbocharger. Even modern and small turbochargers with considerably smaller turbine and compressor wheel diameters which exhibit improved rotation acceleration behavior on account of a considerably smaller moment of mass inertia are affected by the problem of the permissible maximum rotation speed being exceeded. Depending on the configuration of the turbocharger, even an instance of the rotation speed limit being exceeded by approximately 5% leads to complete destruction of the turbocharger.

Charge pressure control valves which are actuated by a rotation speed sensor according to the prior art have proven useful for limiting the rotation speed. If the charge pressure exceeds a predefined threshold value, the charge pressure control valve opens and conducts a portion of the exhaust gas mass flow past the turbine. This consumes less power on account of the reduced mass flow rate, and the compressor power drops to the same extent. The charge pressure and the rotation speed of the turbine wheel and of the compressor wheel are reduced. WO 2006/005662 A1 discloses the use of active sensors, for example Hall sensors or magnetoresistive sensors, for measuring the rotation speed of the turboshaft and for actuating the charge pressure control valve. However, the temperature prevailing in and across the turbocharger is a critical variable for these active sensors. Sensors produced on the basis of a semiconductor can be used at temperatures of up to 170° C. If the temperature in the semiconductor rises above this value, it may lead to irreparable damage to the sensor, as a result of which a faulty rotation speed signal may be produced in turn, this ultimately possibly leading to excessive rotation of the running gear, as a result of which the turbocharger would be destroyed.

SUMMARY OF THE INVENTION

The invention is therefore based on the object of specifying an apparatus and a method of measuring the temperature across the turbocharger, and in particular across the turbocharger in the region of the active sensor. The method and the apparatus should be as cost-effective as possible in this case.

With regard to the apparatus, this object is achieved, according to the invention, in that the current/voltage characteristic curve of the diode is evaluated for determining the temperature in the sensor element. It is advantageous here for the diode, which is present in the protective circuit of the active sensor element in any case, to also be used to monitor the temperature in the sensor element. This measure provides temperature measurement values which may be of high importance for operation of the exhaust gas turbocharger, with very low outlay. In this case, the sensor element can be attached to the turbocharger in such a way that the temperature of the turbocharger at the point of attachment of the sensor element is measured. However, the sensor element can also be thermally decoupled from the turbocharger if the rotation speed measurement is performed at a hot point (above 170° C.). Nevertheless, conclusions can be drawn about the temperature prevailing across the exhaust gas turbocharger by using the sensor element according to the invention with the aid of the thermal coupling constant.

If a switch is formed between the signal pin and the supply voltage pin, said switch either connecting the supply voltage pin to the supply voltage in order to detect the rotation speed of the exhaust gas turbocharger or connecting the signal pin to the current source in order to detect the temperature, the corresponding signal (rotation speed or temperature) can be tapped off as required. It is advantageous here if the switch is in the form of a digital switch.

In a development of the invention, the voltage which is dropped across the diode is used as a measure of the temperature in the sensor element. Voltage measurements in the range of the voltage which is dropped across the diode require only little technical outlay and they can be implemented in a cost-effective manner. In this case, the voltage drop across the diode can be detected in a digital or analog fashion.

In an advantageous development, the circuit for detecting the temperature of the sensor element is at least partly formed on the ASIC of the sensor chip. This has the advantage that an external evaluation circuit for the temperature signal of the sensor element is unnecessary. ASICs are generally produced in accordance with customer requirements and only very little additional outlay is required to integrate further electronic components, for example the switch and the voltage measurement apparatus, on the same ASIC.

According to an advantageous embodiment, the active sensor element can be mounted on the outer wall of the compressor casing in the region of the air inlet. In this embodiment, no intervention has to be made in the compressor casing or in the air inlet of the turbocharger. The cross section of the air inlet is completely maintained and no undesirable effects can be created in the flow of air upstream of the compressor wheel by the sensor element or the sensor. A powerful magnet for example, which is arranged in the compressor-side end of the turboshaft, generates, when the turboshaft rotates, a sufficiently severe variation in the magnetic field in the sensor element arranged on the outer wall of the compressor casing, and so an electrical signal which corresponds to the rotation speed of the turboshaft can be generated in the sensor.

With regard to the method, the object is achieved by an active sensor element which serves to detect the rotation speed of an exhaust gas turbocharger and which comprises a sensor chip and a protective circuit which has at least one diode, with:
a) a switch first disconnecting the supply voltage (vcc) from the sensor chip and connecting the diode to a voltage source,
b) a voltage measurement apparatus then measuring the voltage drop across the diode, and
c) conclusions finally being drawn about the temperature in the sensor element from the measured voltage drop when the fed current is known.

BRIEF DESCRIPTION OF THE DRAWINGS

Embodiments of the invention are illustrated by way of example in the figures, in which.

DETAILED DESCRIPTION OF THE PREFERRED EMBODIMENTS

Figure 1:
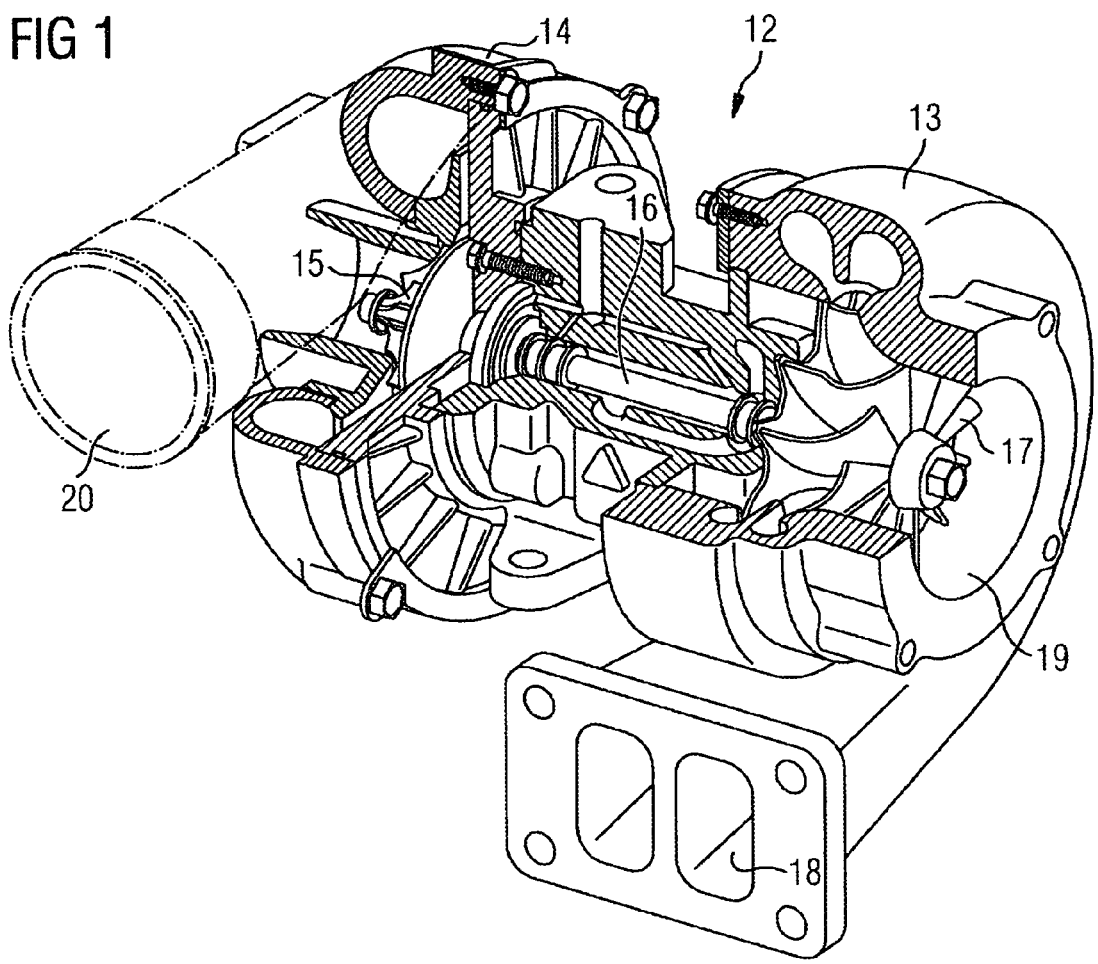
FIG. 1 shows an exhaust gas turbocharger.

FIG. 1 shows an exhaust gas turbocharger 12 with a turbine 13 and a compressor 14. The compressor wheel 15 is rotatably mounted in the compressor 14 and connected to the turboshaft 16. The turboshaft 16 is also rotatably mounted and connected at its other end to the turbine wheel 17. Hot exhaust gas is passed from an internal combustion engine (not illustrated here) into the turbine 13 via the turbine inlet 18, with the turbine wheel 17 being set in rotation. The exhaust gas flow leaves the turbine 13 through the turbine outlet 19. The turbine wheel 17 is connected to the compressor wheel 15 by means of the turboshaft 16. The turbine 13 drives the compressor 14 in this way. Air is drawn into the compressor 14 through the air inlet 21, then compressed in the compressor 14 and supplied to the internal combustion engine via the air outlet 20.

Figure 2:
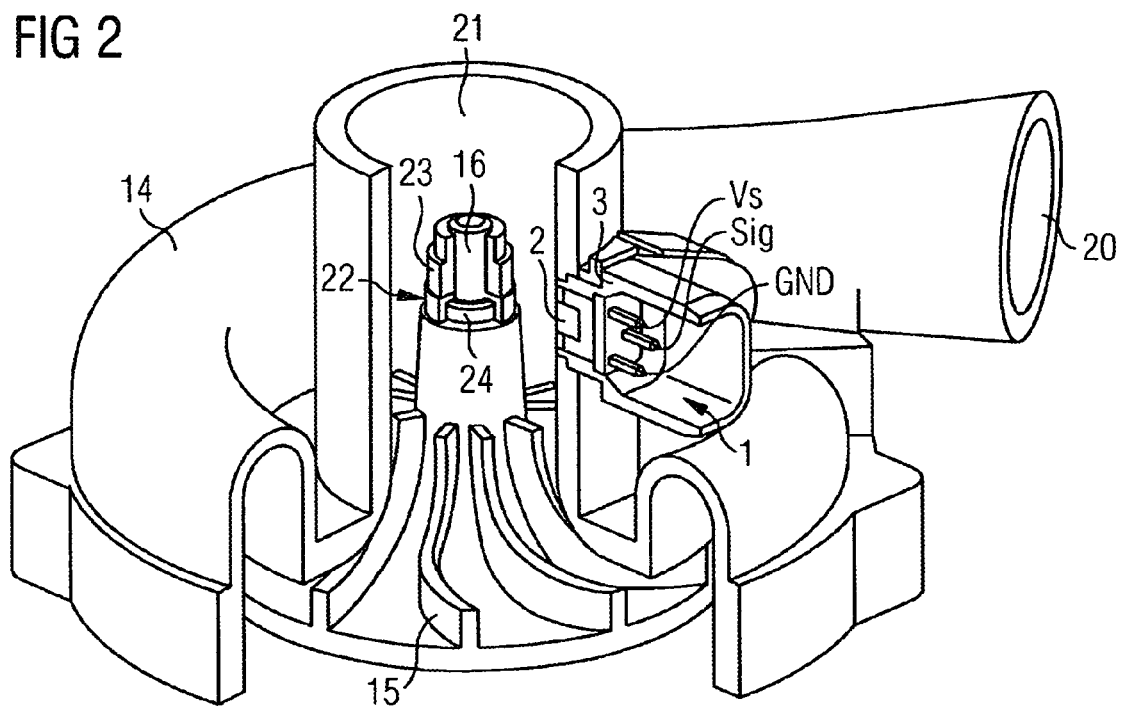
FIG. 2 shows the compressor of the exhaust gas turbocharger.

FIG. 2 shows the compressor 14 of the exhaust gas turbocharger 12 with the turboshaft 16 and the compressor wheel 15. The compressor wheel 15 can be produced, for example, from an aluminum alloy using a precision casting method. The compressor wheel 15 is fixed to the compressor-side end 22 of the turboshaft 16 generally using a fixing element 23. This fixing element 23 can be, for example, a cap nut which firmly braces the compressor wheel 15, with a sealing sleeve, a bearing collar and a spacer sleeve, against the turboshaft collar. To this end, a thread can be formed at the compressor-side end 22 of the turboshaft 16.

A magnet 24 is formed between the fixing element 23 and the turboshaft 16 at the compressor-side end 22 of the turboshaft 16. The magnet 24 serves to vary a magnetic field (not illustrated here) during rotation of the turboshaft 16. This variation in the magnetic field is detected by the active sensor element 1. To this end, a sensor chip 2 is formed in the active sensor element 1, it being possible to design said sensor chip, for example, as a Hall element or a magnetoresistive element. Furthermore, FIG. 2 shows three electrical connection pins on the active sensor element 1, with Vs denoting the supply voltage pin, Sig denoting the signal pin and GND denoting the ground pin. These three pins are generally required to operate an active sensor element 1. An electronic circuit of the sensor chip 2, which for its part is accommodated in the sensor housing 3, is illustrated in FIG. 3.

Figure 3:
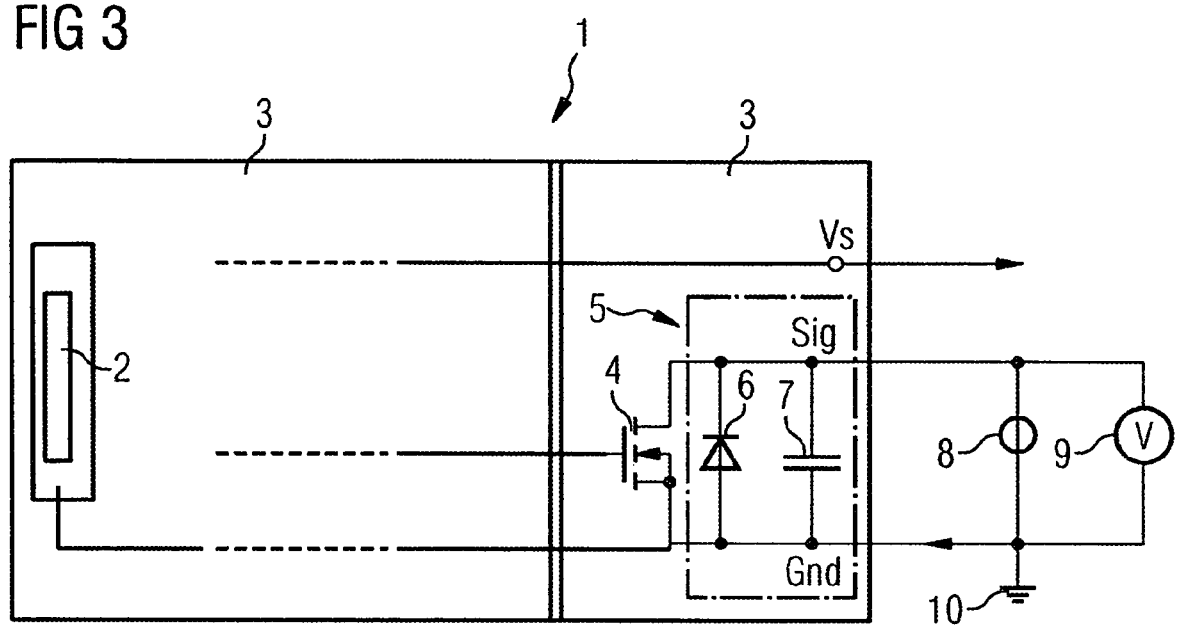
FIG. 3 shows the active sensor element.

FIG. 3 shows the active sensor element 1. An important constituent part of the active sensor element 1 is the sensor chip 2 which is generally in the form of a Hall element or a magnetoresistive element. A transistor 4 is formed in the sensor housing 3 in order to evaluate the signals generated by the sensor chip 2. To this end, the transistor 4 is illustrated in the form of a field-effect transistor. However, it may also be constructed with another design, for example as a bipolar transistor. In order to protect the sensor chip 2 and the transistor 4, the active sensor element 1 has a protective circuit 5. The protective circuit 5 (illustrated here) comprises a diode 6 and a capacitor 7. The diode 6 is also referred to as a freewheeling diode. The capacitor 7 is connected in parallel with the diode 6 here in this example.

Said electronic components are generally formed jointly on a silicon ASIC. An electronic circuit of this type, which contains a protective diode 6, is located in virtually every active sensor element 1 for rotation speed measurement. A constant current can now be supplied to the diode 6 using a current source 8. As a result of the constant current, a voltage drop $U_D$ takes place across the diode 6. This voltage drop $U_D$ can be measured by the voltage measurement apparatus 9. The voltage drop $U_D$ at a constant current $I_D$ across the diode 6 is a function of the temperature T. Therefore, conclusions can be drawn about the temperature T across the diode 6 on the basis of the voltage $U_D$ measured by the voltage measurement apparatus 9. Since the diode 6 is formed together with the sensor chip 2 on an ASIC, the temperature T prevailing across the sensor chip 2 is detected at the same time. This is very useful information which can be used to prevent destruction of the active sensor element 1 by a maximum temperature being exceeded. If an instance of a maximum temperature being exceeded is identified with the aid of the current/voltage characteristic curve of the diode 6, countermeasures can be initiated in order to cool the active sensor element 1 and the turbocharger 12. For this purpose, it is feasible, for example, to increase cooling of the charge air or to increase cooling of the engine. Very high temperatures are reached in the turbocharger primarily after very heavy loading of the internal combustion engine and of the turbocharger, for example on account of fast freeway driving. If the journey is then interrupted and the internal combustion engine is turned off, this may lead to a temperature build-up in the turbocharger 12, as a result of which the temperature T in the turbocharger 12 and in the sensor element 1 rises in an extreme fashion. This can lead to damage of the turbocharger 12 by, for example, lubricant coking on the turboshaft 16. Measurement of the temperature T across the turbocharger 12 with the aid of the current/voltage characteristic curve of the diode 6 of the active sensor element 1 allows cooling of the turbocharger 12 to be initiated, as a result of which said damage is prevented.

The manner of determining the temperature T across the active sensor element 1 shown here is extremely cost-effective and efficient since the active sensor element 1 contains the diode 6 used for temperature measurement purposes in any case. It is only necessary to provide a current I from a current source 8 which is present in every vehicle. Furthermore, a voltage measurement apparatus 9 has to be provided, this being possible in a very cost-effective manner. The circuit, shown in FIG. 3, comprising a current source 8 and a voltage measurement apparatus 9 can then be connected between the signal pin Sig and the ground pin GND. The basic circuit shown here is extended by the switch 11 shown in FIG. 4 for operation of the active sensor element 1 as a rotation speed sensor. This switch 11, which is generally designed as an electronic switch, permits changeover between rotation speed measurement operation (rotation speed mode) of the active sensor element 1 and temperature measurement operation (temperature mode) of the active sensor element 1.

Figure 4A:
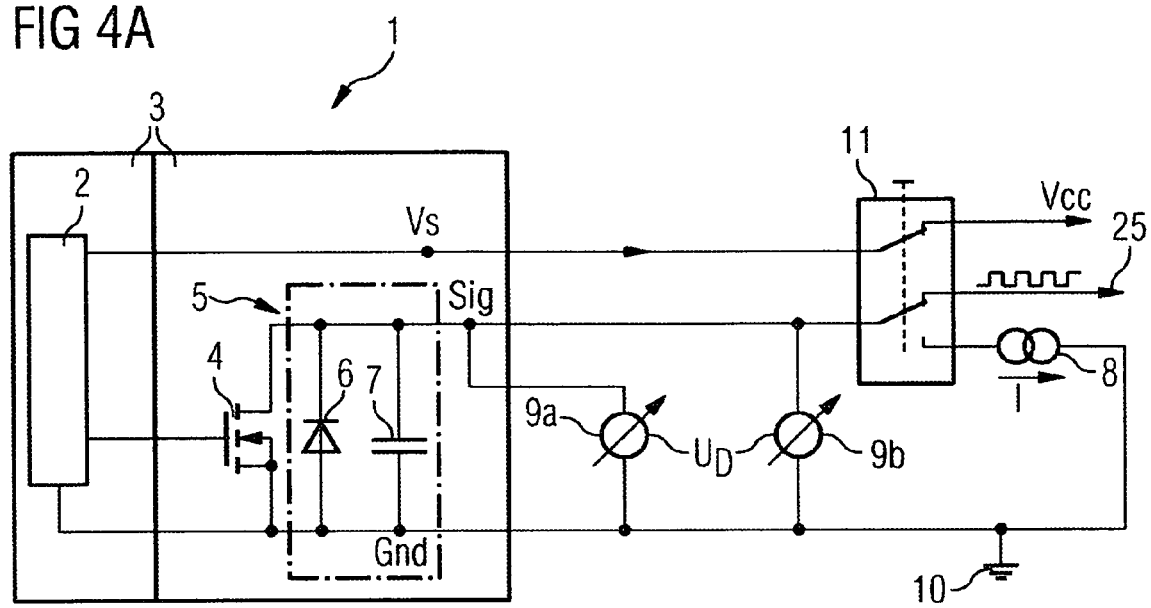
FIG. 4a shows the design known from FIG. 3 with an extended circuit in the rotation speed measurement mode.

FIG. 4a shows, in principle, the design known from FIG. 3, with the sensor chip 2 again being arranged in the sensor housing 3 of the active sensor element 1. The sensor chip 2 detects the variation in the magnetic field and therefore the rotation speed of the turboshaft 16. The measurement signal is processed by the transistor 4 and the protective circuit 5 protects the sensor chip 2 and the transistor 4. In order to measure the rotation speed, the sensor chip 2 is connected to the supply voltage Vcc via the switch 11. This connection is made via the supply voltage pin Vs. The ground pin GND of the active sensor element 1 is connected to ground 10. In the shown position of the switch 11, the active sensor element 1 delivers the rotation speed signal 25 which is schematically illustrated as a square-wave signal. The temperature is not measured in this switch position.

Figure 4B:
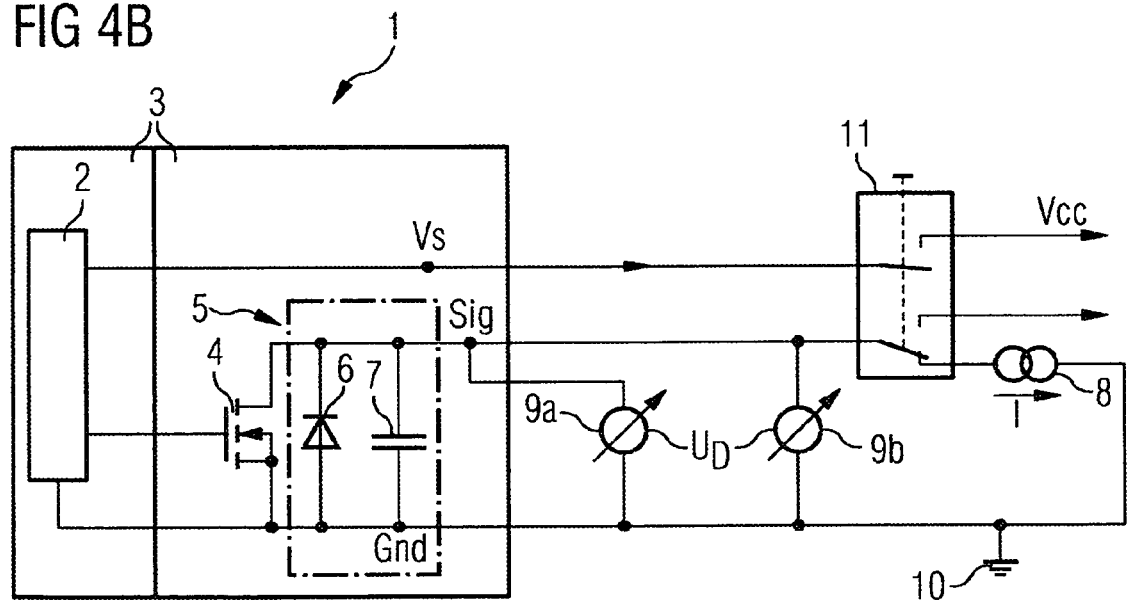
FIG. 4b shows the design known from FIG. 4a in the temperature measurement mode.

If, however, the electronic switch 11 is thrown, as illustrated in FIG. 4b, the supply voltage Vcc of the sensor chip 2 is interrupted and the temperature can be measured since the current source 8 is now connected to the diode 6 and a constant current $I_D$ flows across the diode 6. A specific voltage $U_D$ is dropped across the diode 6 depending on the temperature T across the ASIC and therefore across the diode 6. This voltage $U_D$ can be detected either using a digital voltmeter 9a or an analog voltmeter 9b. Conclusions can be drawn about the temperature T across the diode 6 from the voltage $U_D$ dropped across the diode 6 when the constant current $I_D$ is applied. This temperature characteristic is illustrated in FIG. 5.

Figure 5:
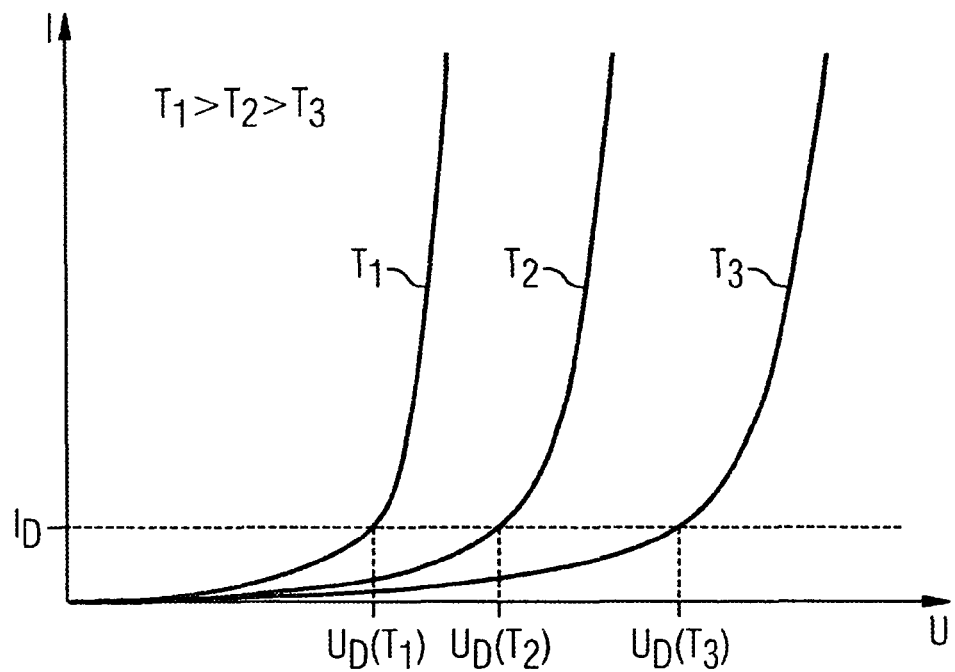
FIG. 5 shows the current/voltage characteristic curves of a diode as a function of the temperature.

FIG. 5 shows the current/voltage characteristic curves of a diode 6 as a function of the temperature T. It can clearly be seen that the voltage $U_D$ which is dropped across the diode 6 is a function of the temperature T at a selected constant current intensity $I_D$. If, for example, a relatively low voltage $U_D(T_1)$ is dropped across the diode 6, a high temperature $T_1$ prevails across the diode 6. When a medium voltage $U_D(T_2)$ is dropped, the medium temperature $T_2$ prevails across the diode 6, and when a high voltage $U_D(T_3)$ is dropped, a low temperature $T_3$ prevails across the diode 6. Therefore, the current/voltage characteristic map of the diode 6 can be used to directly draw conclusions about the temperature prevailing across said diode. If the entire current/voltage characteristic map of the diode 6 is stored in an electronic memory, conclusions can be drawn about the temperature T across the diode 6 and across the ASIC by every current/voltage measurement. A constant current source would therefore be superfluous when the current I flowing through the diode 6 is measured. The current intensity I is therefore a function of the voltage $U_D$ depending on the temperature: $I \sim U_D(T)$.

Figure 6:
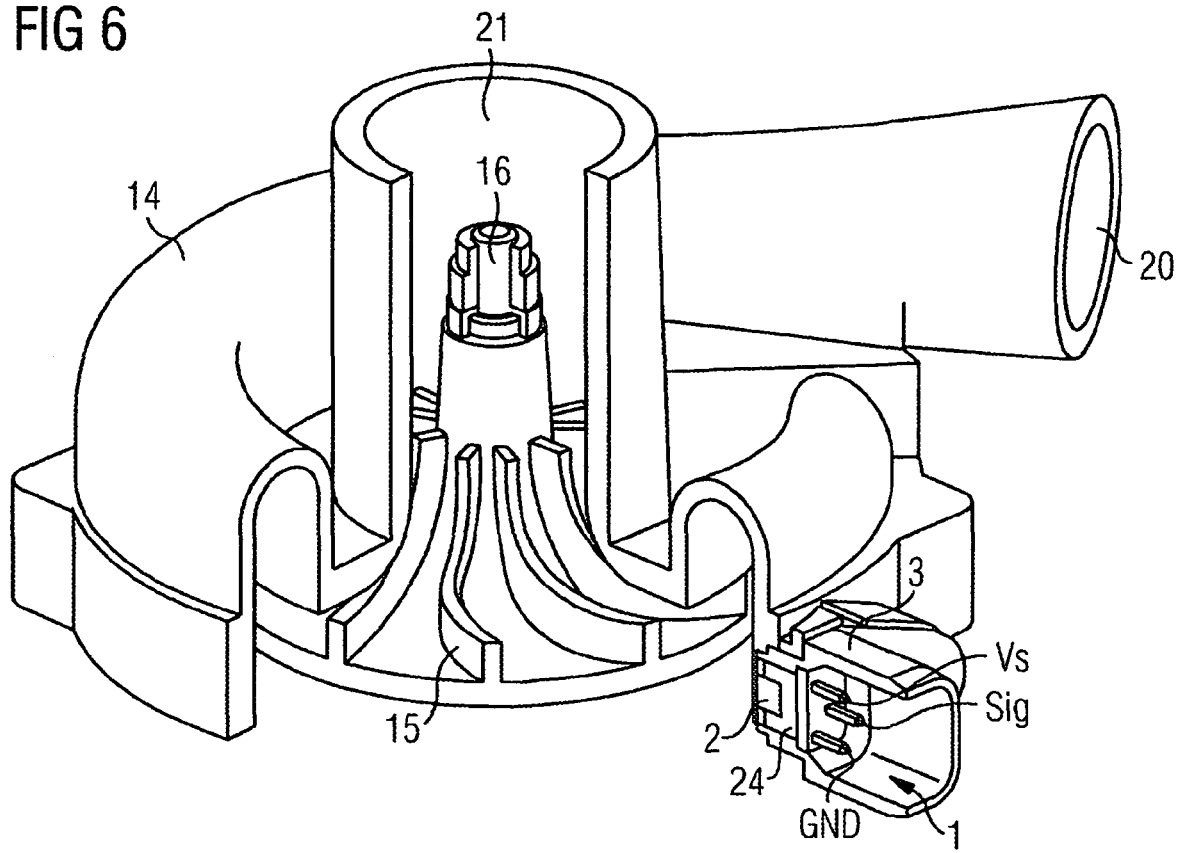
FIG. 6 shows a further form of the arrangement of an active sensor element on the turbocharger.

FIG. 6 shows a further form of the arrangement of the active sensor element 1 for measuring the rotation speed on the turbocharger 12. In this case, the active sensor element 1 is arranged level with the blades of the compressor wheel 15. The magnet 24 is located in the sensor housing 3 of the active sensor element 1. The rotation speed is measured in accordance with the eddy current method, with the temperature measurement being performed analogously to the manner described in FIG. 4b. In general, it is not important for the measurement principle according to the invention where on the turbocharger 12 the active sensor element 1 is arranged. The temperature measurement in accordance with the principle of evaluating the current/voltage characteristic curve of the diode 6 can be performed at any point on the turbocharger 12. The invention discloses an extremely cost-effective and efficient means for monitoring the temperature relationships across the turbocharger 12, which means, on account of its protective effect for the turbocharger 12 and the internal combustion engine, has an economical significance which is not to be underestimated.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A sensor for detecting rotation speed of an exhaust gas turbocharger, the sensor comprising:
   an active sensor element adapted to detect the rotation speed of the exhaust gas turbocharger; and
   a protective circuit, the protective circuit comprising a diode,
   wherein at least one current voltage curve of the diode represents a temperature of the active sensor element.

2. The sensor according to claim 1, wherein the sensor is affixed to the exhaust gas turbocharger at a point on the exhaust gas turbocharger and the active sensor element is at substantially a same temperature as a temperature of the exhaust gas turbocharger at the point the sensor is affixed to the exhaust gas turbocharger.

3. The sensor according to claim 1, further comprising:
   a switch adapted to couple a supply voltage connection of the active sensor element to a supply voltage and to couple a second connection to one of an output and a current source.

4. The sensor according to claim 3 wherein the switch is a digital switch.

5. The sensor according to claim 3, wherein the switch is adapted to couple the supply voltage connection to of the supply voltage and couple the second connection to one of the output to output a signal representing the rotation speed of the exhaust gas turbocharger and to the protection circuit to output a signal representing the temperature of the active sensor.

6. The sensor according to claim 3 when the supply voltage is a constant current source.

7. The sensor according to claim 3 wherein a voltage drop across the diode corresponds to the temperature of the active sensor element.

8. The sensor according to claim 7 further comprising a digital voltage detector to detect the voltage drop across the diode.

9. The sensor according to claim 7 further comprising an analog voltage detector to detect the voltage drop across the diode.

10. The sensor according to claim 7 wherein the circuit for detecting the temperature is formed as ASIC.

11. The sensor according to claim 1, wherein when the active sensor element is affixed to the exhaust gas turbocharger at an outer wall of a compressor casing in the region of the air inlet.

12. The sensor according to claim 1 further comprising a capacitor connected in parallel with the diode.

13. The sensor according to claim 12 further comprising transistor coupled between the active element and the protection circuit.

14. The sensor according to claim 1 when a active sensor in a Hall effect sensor.

15. The sensor according to claim 1 when the active sensor is a magnetoresistive element.

16. A method of operating a sensor assembly adapted to detect a rotation speed of an exhaust gas turbocharger and which comprises an active sensor element and a protective circuit having at least one diode, the method comprising:
   providing the active sensor element with a supply voltage and monitoring an output of the sensor, the output of the active sensor representing the rotation speed of the exhaust gas turbocharger;
   disconnecting the supply voltage from the active sensor element and connecting the diode to a source; and
   measuring the voltage drop across the diode, wherein the voltage drop across the diode represents a temperature of the active sensor element.

17. The method of operating a sensor assembly according to claim 16, wherein the temperature of the active sensor element is based in part on the voltage drop across the diode at a given current.

18. The method of operating a sensor assembly according to claim 16, wherein the source is a constant current source.

19. The method of operating a sensor assembly according to claim 16, wherein the output of the active sensor is a square wave.

* * * * *